Figure 1:
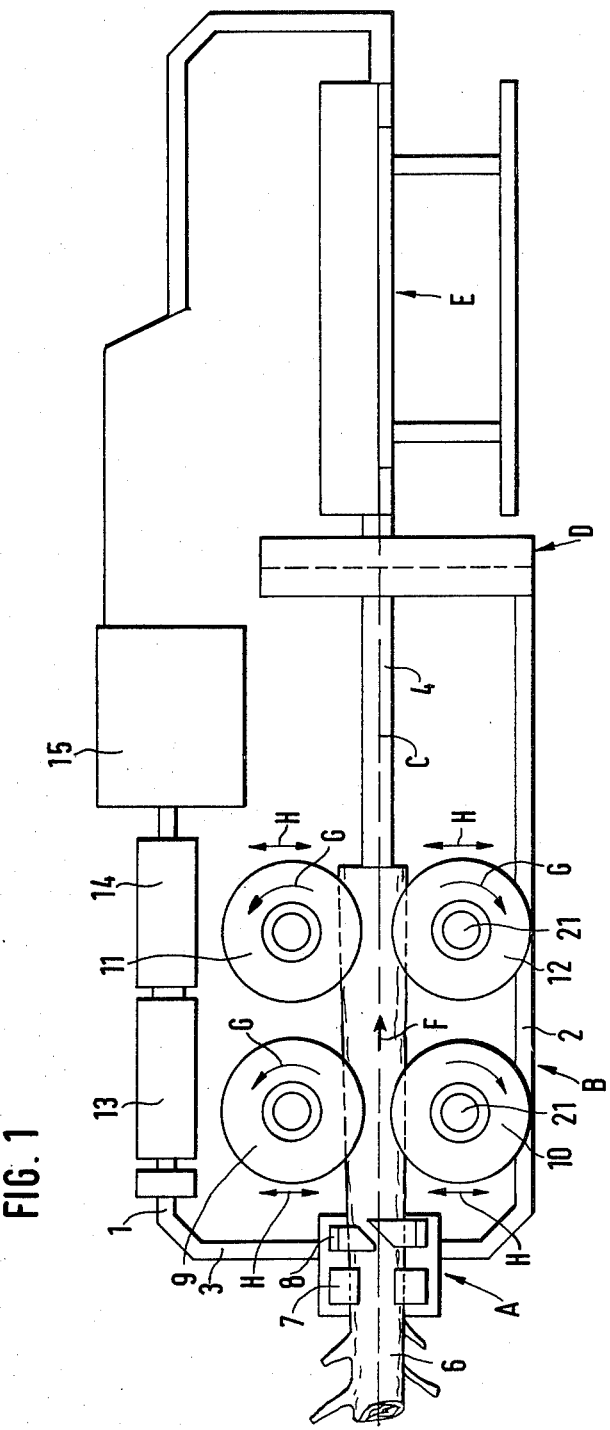

United States Patent [19]

Karlsson

[11] 4,222,420
[45] Sep. 16, 1980

[54] DEVICE FOR FEEDING LOGS

[76] Inventor: Börje Karlsson, S-360 40 Rottne, Sweden

[21] Appl. No.: 875,756

[22] Filed: Feb. 7, 1978

[30] Foreign Application Priority Data

Feb. 9, 1977 [SE] Sweden ................. 7701415

[51] Int. Cl.³ .............................. B27B 31/00
[52] U.S. Cl. .......................... 144/246 A; 152/354 R;
    144/2 Z; 144/246 F; 198/780; 198/788
[58] Field of Search ............... 152/354 R, 361, 379.2,
    152/38.12; 198/655, 780, 788; 144/246 R, 246
    A, 246 C, 246 E, 246 F, 2 Z, 208 F, 208 R

[56] References Cited

U.S. PATENT DOCUMENTS

| 2,948,508 | 8/1960 | Hykes et al. | 152/381.2 |
| 3,720,247 | 3/1973 | Lindblom | 144/2 Z |
| 3,842,882 | 10/1974 | Gough et al. | 152/354 X |
| 3,866,640 | 2/1975 | Sweet et al. | 144/246 A |
| 3,877,503 | 4/1975 | Tangorra et al. | 152/379.2 |
| 3,903,946 | 9/1975 | French et al. | 152/379.2 X |
| 3,938,575 | 2/1976 | Boileau | 152/354 X |
| 4,076,067 | 2/1978 | Gill | 152/381.2 |
| 4,121,641 | 10/1978 | Nakasaki | 152/354 R |

FOREIGN PATENT DOCUMENTS

| 2136474 | 2/1973 | Fed. Rep. of Germany | 144/2 Z |
| 22085 | 3/1934 | United Kingdom | 144/246 A |
| 426822 | 1/1975 | U.S.S.R. | 144/2 Z |

Primary Examiner—W. Donald Bray
Attorney, Agent, or Firm—Schwartz, Jeffery, Schwaab, Mack, Blumenthal & Koch

[57] ABSTRACT

Log feeding wheels are provided with resilient tires to conform to the sides of the logs. Stiffening members are provided to prevent the upper portions of the tires from deflecting as much as the lower portions and thus hold the logs against moving upwardly as they are fed.

10 Claims, 4 Drawing Figures

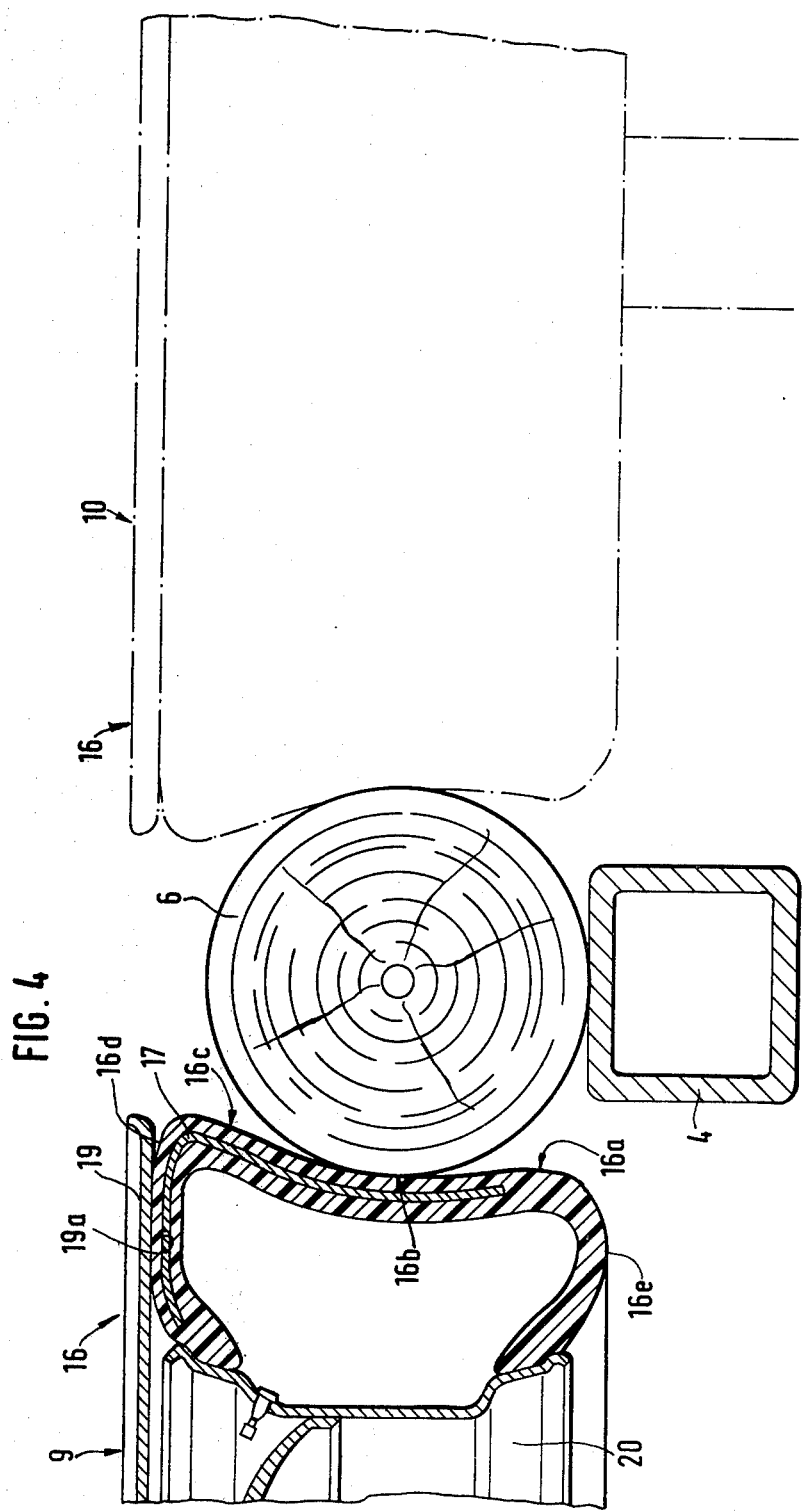

DEVICE FOR FEEDING LOGS

The present invention relates to a device adapted to feed logs through a processing machine. e.g. a lopping aggregate, whereby the log feeder has at least one pair of feed wheels arranged to be pressed against a log which from above is placed in a feeding path running between the feed wheels and defining a log feeding path of which the contact portions, by yielding when the feed wheels are pressed against the log, are shaped to clutch a part of the periphery of the log and whereby the processing machine includes at least one holder preventing the log from deviating from its feeding path in upwards direction.

It has been noted that feed wheels of the above type permit efficient feeding without damaging the logs. The efficient feeding is obtained e.g. while the feed wheels are capable of shaping themselves after the logs and continuously change their shape. The wheel obtains this shaping ability while the log feeding portions thereof may be displaced when subjected to a certain pressure. However, there is a risk that this displacement capability also may result in that the log during the feeding is pressed upwards until the feed wheels loose their grip of the log, whereby the log may be thrown away at great velocity and accidents occur.

It is previously known in processing machines to arrange one or more support wheels engaging the top of the log in order to press down the same during processing. However, such a wheel must be removed each time a log shall be placed in the feeding path, which means that the processing machine must be provided with an extra frame arrangement having movable members and structurally complex and in the way. In addition, the movements of the support wheel mean several and long interruptions in the processing of logs, since every movement takes a long time.

The object of the present invention is to eliminate this drawback and in devices of the aforementioned type provide a very efficient holder by such simple means that any extra frame arrangement positioned above the feed wheels is obviated and an open area is provided above and extending along a log support bed so that a log may be lowered from a position directly above the feed path into the feed path. This object is fulfilled substantially is that the holder comprises at least one reinforcement forming part of one or more of the feed wheels and reinforcing at least a part of the contact portion of the log feeding travel bending over the log.

Figure 2:
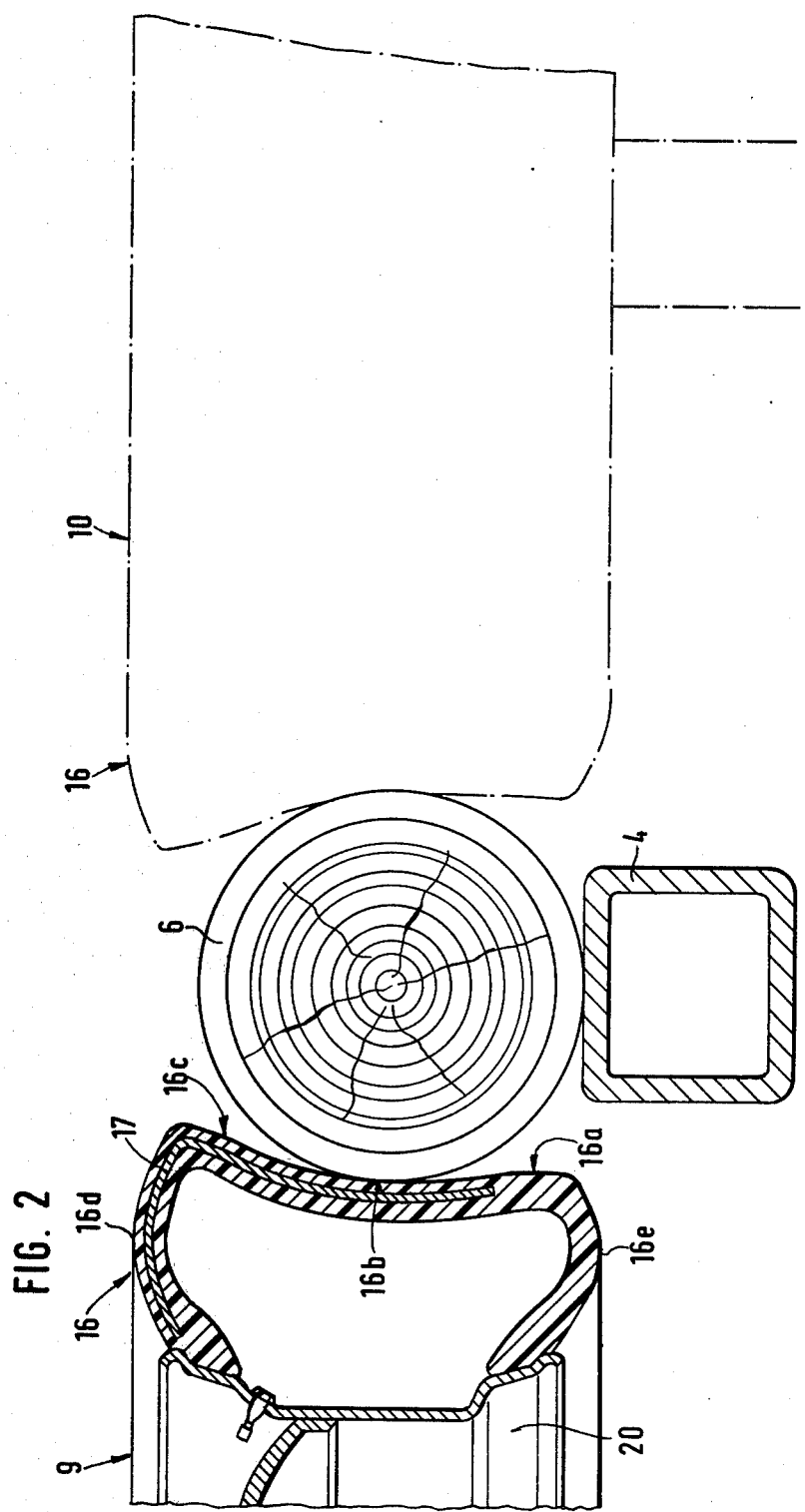
Figure 3:
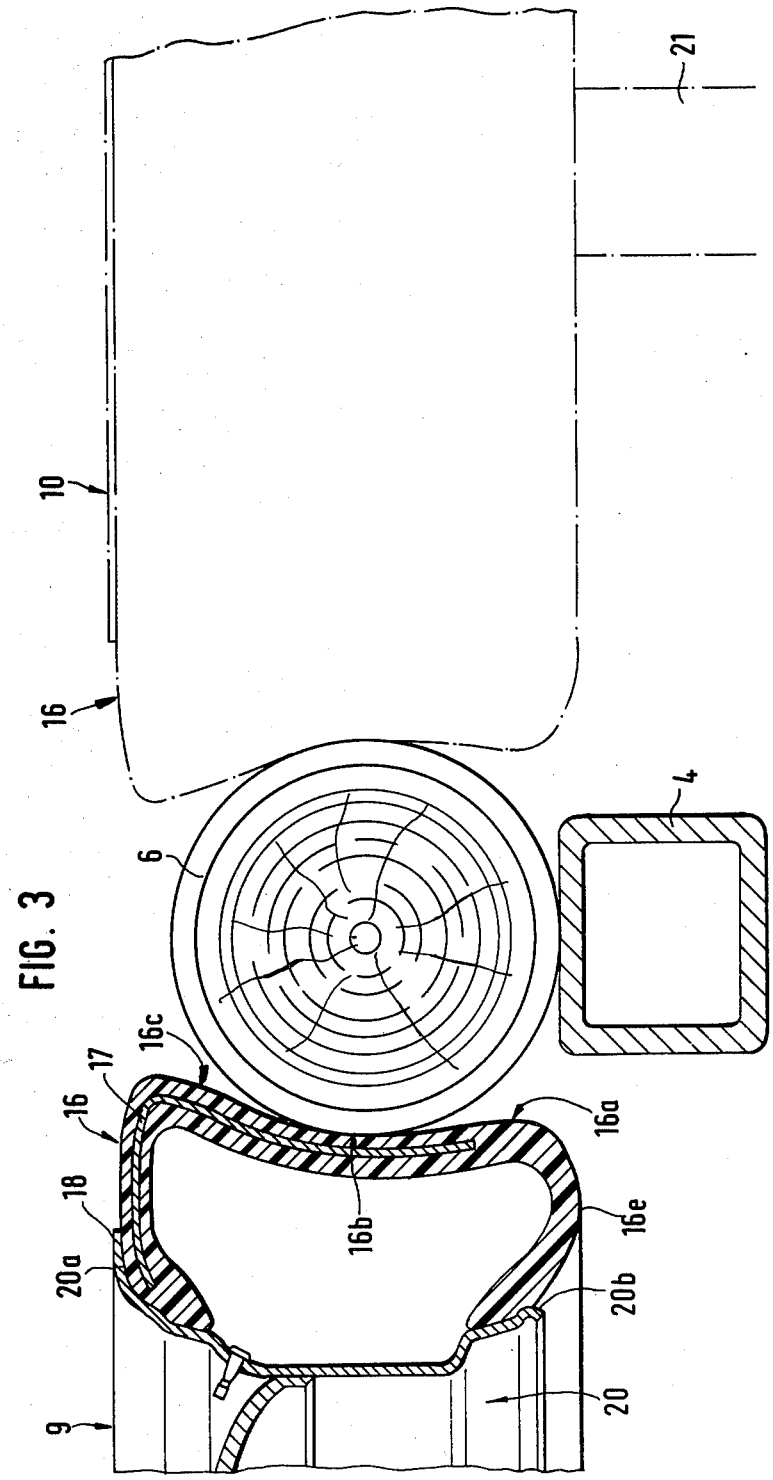

For a more complete understanding of the nature and scope of the invention, reference is made to the drawings in which:

FIG. 1 is a plan view schematically illustrating a machine for lopping logs, and FIGS. 2–4 illustrate sections through various feed wheels of different alternative embodiments of a device according to the invention.

FIG. 1 illustrates a log processing machine in the form of a lopping machine already known per se. The machine may be mounted on a chassis (not shown) provided with driving wheels and connectable to a traction vehicle. This chassis has a hoist for lifting logs to be lopped. Furthermore, the chassis is also provided with a storage device for the frame of the lopping machine, said storage device being designed to permit rotation of the frame and adjustment thereof in various inclinations relative to the horizontal plane in order to facilitate the positioning of a lifted log in the machine. The rotation of the frame and the adjustment thereof in various inclined positions is performed by means of hydraulic power units, known per se and therefore not further described which also has reference to the chassis, the hoist and the traction vehicle.

The frame of the lopping machine is made of thick joists of which the most important are shown in the drawings, i.e. the two longitudinal side joists 1 and 2, one of the transverse gable members 3, support joist 4 forming a support bed positioned centrally in the machine in the longitudinal direction thereof and a transverse joist 5.

A lopping mechanism A is mounted on the frame for lopping the log, a log feeder B is mounted for feeding the log along a feeding path C through the lopping mechanism A a crosscutting device D is also mounted and finally a sorting device E is mounted for sorting crosscut logs. The lopping mechanism A may include two pairs of lopping means 7, 8 arranged to be brought and kept tight around the periphery of a log 6 placed to engage the frame of the machine. The lopping mechanism A also has crosscutting means (not shown) for cutting off the top of the log 6. The log 6 is fed along the machine (arrow F) by means of one, two or many pairs of feed wheels 9, 10 and 11, 12 forming part of the log feeder B. The feed wheels are connected to a driving device 13 via a gear box 14 and power transmitting means for rotation (arrows G). All the functions for lopping the log and further processing thereof may be controlled from an operating cabin 15.

The feed wheels 9–12 are movable in the directions of arrows H, i.e. toward and from the feeding path C. Thereby, it is possible to set free a space between the feed wheels in order to place the log 6 on the support joist 4 from an open area above and extending along the support bed formed by support joist 4. By moving the feed wheels in the opposite direction, it is possible to grasp the log and feed the same ahead (arrow F) along the support joist 4. The mechanism mounted on the log feeder B for supporting and moving the feed wheels 9–12 is already known per se and therefore not further described.

Each feed wheel 9–12 defines log feeding wheel 16 of elastic material and/or forming part of a wheel portion of elastic material such that the part of the wheel 16 engaging the log attains the shape of the log when the feed wheels 9–12 are pressed thereagainst. The part 16a of the wheel 16 engaging the log 6 attains concave shape along the periphery thereof such that said part "clutches" the log and permits efficient feeding without damaging the log.

In order to eliminate or at least substantially reduce the risk of the log 6 slipping upwards and out of the grip of the feed wheels 9–12 without using auxiliary equipment in the form of special support wheels mounted on the frame, the holder principally comprises at least one reinforcement 17 and/or 18 and/or 19 forming part of one or more of the feed wheels 9–12 and reinforcing at least a part 16c of the contact portion 16b of the log feeding wheel 16a bending in over the log 6.

An especially simple and efficient holder arrangement is obtained if the holder comprises at least one separate reinforcement and/or stiffening element 17 and/or 18 and/or 19 mounted at the top of the respective feed wheel 9–12. The holder permits an especially fine enlarging effect if it comprises at least one reinforcement and/or stiffening body 17 enclosed within at least upper portions of the log feeding wheel 16a. If the feed wheel has an elastic tire 16 expanded by means of a pressure medium, the reinforcement and/or stiffening body 17 is preferably so arranged that it forms a part of at least a portion of the log feeding wheel 16a into an upper sidewall 16d of the tire but not into a lower sidewall 16e thereof. The reinforcement and/or stiffening body 17 which may comprise a metal mat 17 vulcanized into the tire 16, may extend along the major part of the log feeding surface 16a and along the major part of the upper side 16d of the tire, whereby an efficient holder is obtained and a reinforcement of the feeding portions of the wheel is formed.

If the tire is mounted on a rim, the rim 20 may comprise an upper part 20a of a greater diameter than a lower part 20b, whereby the greater diameter, upper part 20a reinforces and/or stiffens the upper sidewall of the tire 16 while the lower side 16e of the tire more easily gives when loads are applied thereto. In this way the tire 16 can "bend" downwardly such that the upper, reinforced part 16c grasps "longer" in over the log 6.

As shown in FIG. 3 this rim embodiment may be used in combination with a reinforcement 17 enclosed in the tire 16. Alternatively, the rim embodiment may be used also without a tire with a reinforcement element 17 or with tires having a thicker upper sidewall 16d than lower sidewall 16e.

Limiting means 19 may also be arranged as a holder, e.g. in the form of a plate mounted on the feed wheels 9, 10, 11, 12, whereby the underside forms an engaging surface for the upper sidewall 16d of the formable feedwheel parts 16. The limiting means 19 may be arranged on the rim 20 and/or on an axis 21 on which the rim 20 is mounted. In order to permit an advantageous holder effect without being in the way when the feed wheels 9, 10, 11, 12 are moved apart when a log 6 is placed in its feeding travel C, the limiting means 19 may extend radially outwards in relation to the center of the feed wheel (9, 10, 11, 12) to a circular line outside the inner part of the contact portion 16b of the log feeding wheel 16a when said portion is compressed by the log 6, but within not compressed portions of the log feeding wheel 16a. The limiting means 19 may be used instead of or in combination with the holder arrangement illustrated in FIG. 2 and/or FIG. 3.

Instead of or in combination with one or more of the aforementioned holder arrangements, the holder may be defined simply by forming the upper sidewall portions 16d of the hollow body (e.g. the tire 16) thicker than the lower sidewall portions 16e of said body.

From the above it is obvious that the holder may be formed in various ways within the scope of the invention. It is essential that the holder as a reinforcement forms a part of at least one of the feed wheels 9, 10, 11, 12, said reinforcement reinforcing at least a part 16c of the contact portion 16b of the surface 16a bending over the log 6, whereby the log 6 is effectively prevented from slipping upwards and out of the contact portion 16b during processing.

Regarding various embodiments of the holder, it may be finally noted that the reinforcement 17 may have the form of a ring in the tire 16 or as parts of a ring. The enlarged upper part 18 of the rim 20 may extend farther out than what is shown in FIG. 3. The rim 20 may e.g. run as far out as the limiting means 19 and the underside thereof may serve as a support in the same way as the underside 19a of said means 19.

In certain cases it may be sufficient to provide one of the feed wheels 9, 10, 11, 12 with reinforcements 17 and/or 18 and/or 19, but preferably a pair of cooperating feed wheels 9, 10 or 11, 12 are provided with reinforcements, whereby the reinforcements on the various feed wheels preferably but not necessarily are identical. According to the embodiments shown the reinforcements are arranged on rotating parts of the feed wheels, which is preferable but not absolutely necessary.

What I claim is:

1. A device for feeding logs, comprising:
   (a) means forming a horizontal support bed for defining a log feed path;
   (b) at least one pair of elastically resilient feed wheels mounted for rotation about respective generally vertical axes located at opposing sides of the feed path, the axes being movable toward the feed path for resiliently engaging a log and movable away from the feed path to permit a log to be placed in the feed path;
   (c) means for driving the feed wheels rotatingly about their respective axes;
   (d) at least one feed wheel having a resilient upper sidewall, a resilient lower sidewall, and a resilient log feeding surface connecting the upper and lower sidewalls, the log feeding surface conforming generally to the shape of a log being fed when pressed against the log;
   (e) said at least one feed wheel further having means for reinforcing an upper portion thereof, said upper portion comprising at least said upper sidewall, such that, when said at least one feed wheel is moved toward the feed path for resiliently engaging a log to be fed, a portion of the log feeding surface thereof near the lower sidewall flexes radially inwardly to a greater extent than does a portion of the log feeding surface thereof near the upper sidewall;
   (f) whereby as the log is fed along the feed path by the feed wheels, said at least one feed wheel exerts a component of force on the log in a downward direction, thereby preventing the log from slipping upwardly and out of contact with the log feeding surface of the feed wheels.

2. The device of claim 1, further comprising: an open area above and extending along the support bed, said open area being unobstructed whereby a log may from above be placed in the feed path when the feed wheels are moved away from the feed path.

3. The device of one of claims 1 or 2, wherein said reinforcing means comprises at least one stiffening element enclosed within the upper portion of said at least one feed wheel.

4. The device of claim 3, wherein said at least one feed wheel includes an elastic tire comprised of said upper and lower sidewalls and said log feeding surface, wherein said stiffening element forms a part of said tire and extends into the upper sidewall thereof, but not into the lower sidewall thereof.

5. The device of claim 4, wherein said tire is fabricated from rubber material, and said stiffening element comprises a metal mat vulcanized into said tire.

6. A device according to one of claims 1 or 2, wherein said at least one feed wheel comprises a tire mounted on an annular rim, said rim including an upper rim part and a lower rim part, said upper rim part having a larger diameter than the lower part, whereby the larger upper rim part reinforces and/or stiffens the upper sidewall of said tire.

7. A device according to one of claims 1 or 2, wherein said at least one feed wheel has at least one upper limiting means, the underside thereof forming a surface for engaging the upper sidewall of said at least one feed wheel.

8. A device according to claim 7, wherein said limiting means extends radially outward relative to the axis of said at least one feed wheel to a circular line outside the more radially inwardly flexed portion of the log feeding surface of said at least one feed wheel when said log feeding surface is conformed to the shape of the log, but within relatively less radially inwardly flexed portions of the feed wheel.

9. A device according to one of claims 1 or 2, wherein said upper and lower sidewalls and said log feeding surface form a resilient hollow body, said hollow body mounted in a holder, wherein said upper sidewall of said body is thicker than the lower sidewall thereof.

10. A device according to one of claims 1 or 2, wherein each said pair of feed wheels has identical reinforcing means.

* * * * *